United States Patent [19]

Komatsu

[11] Patent Number: 5,076,260
[45] Date of Patent: Dec. 31, 1991

[54] SENSIBLE BODY VIBRATION

[75] Inventor: Akira Komatsu, Tokyo, Japan

[73] Assignee: Bodysonic Kabushiki Kaisha, Tokyo, Japan

[21] Appl. No.: 508,587

[22] Filed: Apr. 13, 1990

[30] Foreign Application Priority Data

Sep. 14, 1989 [JP]  Japan .................................. 1-239656

[51] Int. Cl.$^5$ .............................................. A61H 1/00
[52] U.S. Cl. ..................................... 128/33; 128/24 R
[58] Field of Search ................. 128/33, 32, 44, 54, 128/55, 64, 24 R, 24.1, 24.2, 24.5; 381/162

[56] References Cited

U.S. PATENT DOCUMENTS

| 4,370,602 | 1/1983 | Jones, Jr. et al. | 128/33 |
| 4,750,208 | 6/1988 | Yamada et al. | 381/162 |
| 4,887,086 | 12/1989 | Unser et al. | 342/20 |

FOREIGN PATENT DOCUMENTS

| 60-29275 | 9/1985 | Japan . |
| 63-5788 | 1/1988 | Japan . |
| 63-64194 | 4/1988 | Japan . |
| 63-143064 | 6/1988 | Japan . |
| 1-12461 | 4/1989 | Japan . |
| 1-45192 | 12/1989 | Japan . |
| 28467 | 2/1990 | Japan . |
| 2-10714 | 3/1990 | Japan . |
| 2-129793 | 5/1990 | Japan . |

Primary Examiner—J. Reed Fisher
Assistant Examiner—E. P. Raciti
Attorney, Agent, or Firm—Oliff & Berridge

[57] ABSTRACT

A sensible body vibrator has a vibration unit mounted in a human body support such as a bed or a chair and adapted to generate mechanical vibrations upon receipt of a low-frequency signal. The inputting of various kinds of signals (including a low-frequency signal from an acoustic device, a pleasant sleep signal for inducing the user to pleasant sleep, an awakening signal for generating a signal at a preset time, a signal for transmitting a routine time schedule to particularly the deaf and dumb, a security signal for detecting and announcing the entry of an intruder entering a house through a door or a window or by climbing a wall, an emergency signal for announcing an emergency situation at the time of an emergency such as a fire, and similar other signals) is selectively controlled. The emergency signal is given priority over the other signals when the emergency signal is input.

4 Claims, 6 Drawing Sheets

SENSIBLE BODY VIBRATION

BACKGROUND OF THE INVENTION

1. Field of the Invention

The present invention relates to a sensible body vibrator which produces special effects on the mind and body of a person resting on a body support, such as a chair or a bed, by imparting specific mechanical vibrations to the support.

2. Description of the Prior Art

Music is generally heard by the use of speakers or headphones apart from cases where live performances are heard. The sound from speakers has recently come to be reproduced over the entire audible range of the human ear, but the low-pitched sound of palpable intensity cannot be sensed by the body unless an extraordinarily loud sound is produced. One reason why music from speakers heard at homes or the like is lacking in moving the listener's heart in contrast to music heard at a concert hall or the like, is that the music heard at a concert hall or the like is heard with the sense of hearing and, at the same time, the low-pitched sounds of palpable intensity are sensed by the human body as well. This feature is lacking in the music heard at homes or the like.

Accordingly, for the purpose of correcting this inadequacy, apparatus have been devised by the present inventor and applications for patents therefor filed by the present assignee. These apparatus are typically arranged as follows: A vibration unit is provided for producing mechanical vibrations by supplying thereto an electric current of a low-frequency range below 150 Hz or thereabouts among the frequencies of sounds reproduced from a loudspeaker. This vibration unit is mounted on a body support such as a bed mat, a floor, or the like, and at the same time as music is heard from the loudspeaker, vibrations from the body support are received by the body, thereby producing the effect that the listener can listen to music just as if he or she is doing so at a concert hall.

For instance, Japanese Utility Model publication No. Hei 2-8467 discloses a vibration mat in which a vibration unit, which is supplied with a low frequency electric power, is imbedded and used by putting it on a bed. Japanese Utility Model laid-open application No. Sho 63-5788 discloses a bed mat in which a plurality of vibration units are disposed so as to make those located at every effective spot of the human body when a person lies on the mat. Japanese Utility Model laid-open application No. Sho 63-64194 discloses a vibration unit which is supplied with a low frequency electric power and fastened to the side of a bed mat.

As a vibration unit, various types are conceivable such as a solenoid type, a speaker type, or a motor type. A mechanism of the so-called speaker type is adopted for obtaining vibrations capable of coping with changing signals of music and suited to the compass and stress of music. In this mechanism, vibrations are obtained through magnetic interference action occurring when a magnet and a coil wound in the vicinity of the magnet are energized. In accordance with the vibration unit of this structure, quick changes of music signals can be accommodated unlike vibration units of other types.

Accordingly, it is possible to obtain vibrations that are optimally suited to the aforementioned usage. Furthermore, it is possible to cause the body support to vibrate by means of signals set to such waveforms and strength that are suited to the user's preference or that are medically or psychiatrically preferable.

Thus, since it has been verified that the apparatus of this type, in which vibrations are generated through the magnetic interference action of the magnet and the coil, are not only useful for appreciation of music but are medically or psychiatrically beneficial, these apparatus have become rapidly widespread.

The human ear, which is an acoustic organ, perceives sound waves, but it has long been pointed out that sounds are perceived not only by ears but by the entire body. In the low-frequency range in the audible spectrum of the human ear, the lower the frequencies, the greater the ratio at which the sound is sensed by the body than the case where it is heard by the ears. Acoustic energy in this low-frequency range has a characteristic that it causes a surface or an object against which it has collided to vibrate. This acoustic energy is not only sensed by the human body as sound pressure transmitted through the air, but also there are cases where the acoustic energy accompanies vibrations that are transmitted through the ground, a floor, or the like. These types of vibrations constitute elements of sound information, and are ultimately perceived as a sound.

Those vibrations that are sensed by the body when the sound pressure is transmitted through the air and causes the body to vibrate as well as those vibrations that are sensed by the body when the sound pressure is transmitted thereto through a floor surface or the like (regardless of whether they are sensed consciously or unconsciously) will be referred to herein as the "bodily sensible sound vibrations".

As for these bodily sensible sound vibrations, in general, the lower the frequencies, a greater proportion of them are sensed by the body more than by the ears. These bodily sensible vibrations bring about psychological and physiological pleasures, including the sense of low-pitched sound of palpable intensity, rhythmical sense, sense of energy, fascination, and ecstasy, thus appealing to human organic functions. On the other hand, certain types of vibration (sound) can arouse the senses of anxiety, tension, or a sensation of fear.

As an apparatus making use of bodily sensible sound vibrations, transducers (board speakers) of a sound reproduction system, which directly cause vibratory plate surfaces such as walls, ceilings, and floor surfaces to vibrate, were manufactured in the 1960s and 1970s.

Various types of transducers have also been developed by the present inventor for various purposes, and in an electrical system for driving them, audio signals are not only applied, but various types of signal processing techniques are employed. In that case, signal processing techniques are used that are adapted to the performance of both the transducer and a vibration system, and are suited to psychological and physiological conditions concerning bodily sensible sound vibrations. As various signal sources, apart from music, bodily sensible vibrations caused by the repetition of monotonous sounds, including documentary sounds such as those of running trains and steam locomotives, soothing sounds of waves or bells, are often used as part of music therapy. It is thus possible to obtain the effect that even if music is absent, both the mind and body can be relaxed by the bodily sensible vibrations using vibration signals alone.

As described above, the sensible body vibrator has the characteristic of serving as an auxiliary tool for audio equipment. Since it has been verified that this type of apparatus is medically and psychiatrically efficacious, the users are not confined to young people who are fond of music, and these sensible body vibrators have been used widely for preventing the senility of the elderly, for curing or preventing melancholia, for rehabilitation during convalescence, and for other similar purposes.

SUMMARY OF THE INVENTION

Accordingly, an object of the present invention is to provide an improved sensible body vibrator which can be mounted irrespective of the type of a body support, which has a circuit configuration for allowing the sensible body vibrator to function as an overall vibration system, and which permits the inputting of various signals for the aforementioned purposes such that a signal representing the occurrence of an emergency situation is input to a vibration unit preferentially over other signals so as to produce specific bodily sensible vibrations.

To this end, in accordance with the present invention, there is provided a sensible body vibrator comprising: signal generating means for generating signals having a plurality of kinds of waveforms respectively conforming with contents to be transmitted; selection means for selecting an arbitrary waveform from among the plurality of kinds of waveforms generated by the signal generating means; timer means for effecting the selection with a lapse of time; a fire alarm circuit for generating an emergency waveform signal irrespective of the operation of the timer means upon receipt of an alarm signal from an externally installed fire alarm at the time of the occurrence of a fire; an amplifier for amplifying the signal generated by the signal generating means; and a vibration unit for causing a human body support such as a bed pad to vibrate upon receipt of an output signal of the amplifier.

The above and other objects, features and advantages of the invention will become more apparent from the following detailed description of the invention when read in conjunction with the accompanying drawings.

DETAILED DESCRIPTION OF THE PREFERRED EMBODIMENTS

Figure 1:
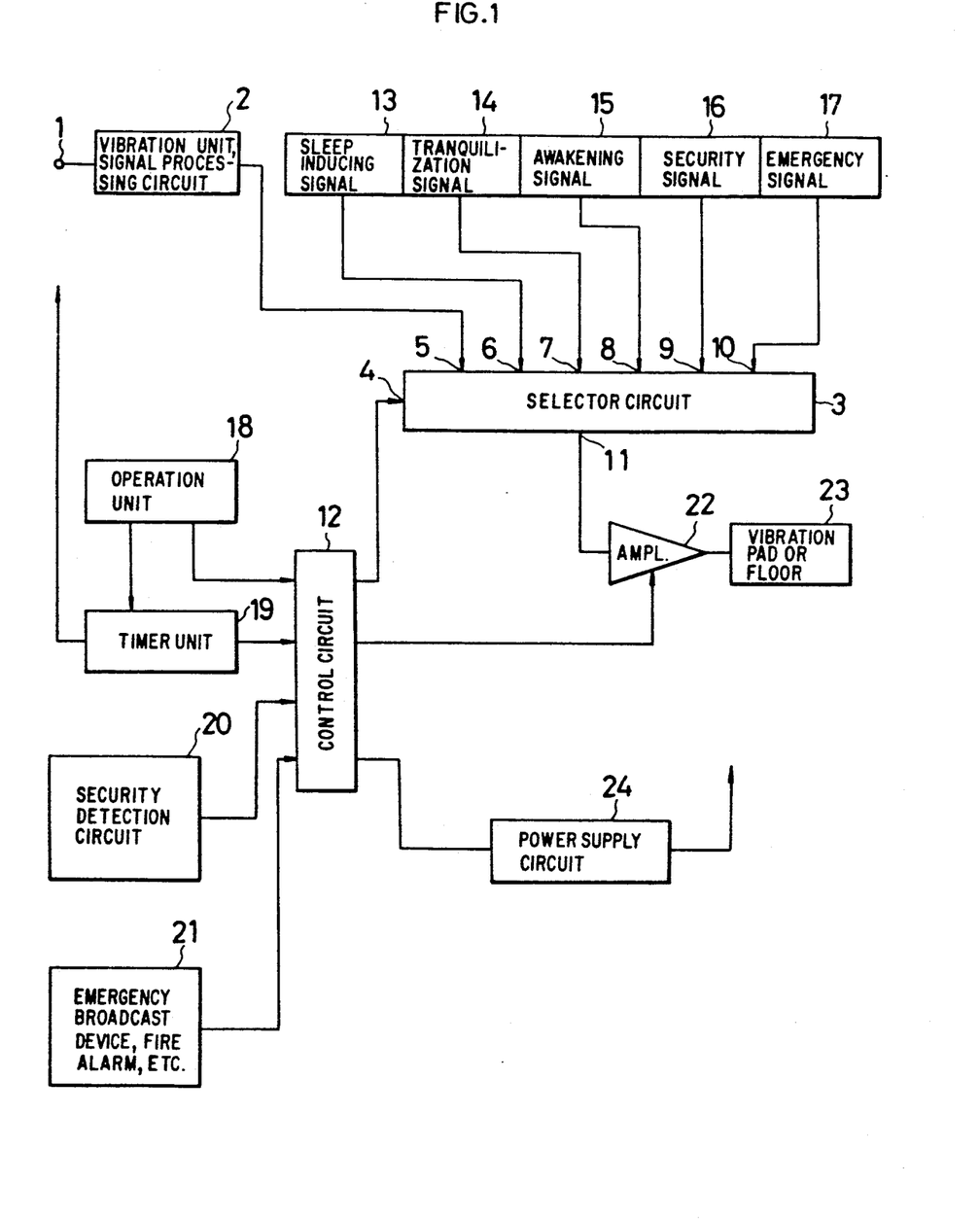
FIG. 1 is a block diagram illustrating a first embodiment of the present invention.
Figure 6:
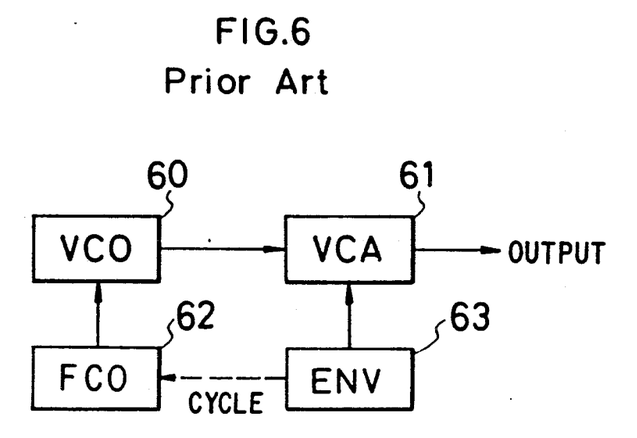
FIG. 6 is a block diagram illustrating an example of a signal processing circuit of a conventional vibration unit.

Referring now to FIG. 1, a description will be given of an embodiment of the present invention. An input terminal 1 receives a low-frequency signal (about 150 Hz or below as described above) from unillustrated audio equipment. A vibration unit signal processing circuit 2 is connected to the input terminal 1. The vibration unit signal processing circuit 2 has the function of forming the input signal into a waveform suitable for being supplied to an unillustrated vibration unit. As a specific example of the vibration unit signal processing circuit 2, one disclosed in Japanese Patent Laid-Open No. 143064/1988, which is shown in FIG. 6, is known. In the drawing, reference numeral 60 denotes a voltage controlling oscillator (hereinafter referred to as the VCO), and numeral 61 denotes a voltage controlling amplifier (hereinafter referred to as the VCA). An output signal of the VCO 60 is amplified by the VCA 61, and is supplied to the unillustrated vibration unit. Reference numeral 62 denotes a frequency controlling oscillator (hereinafter referred to as the FCO), and numeral 63 denotes an envelope oscillator (hereinafter referred to as the ENV).

Figure 7:
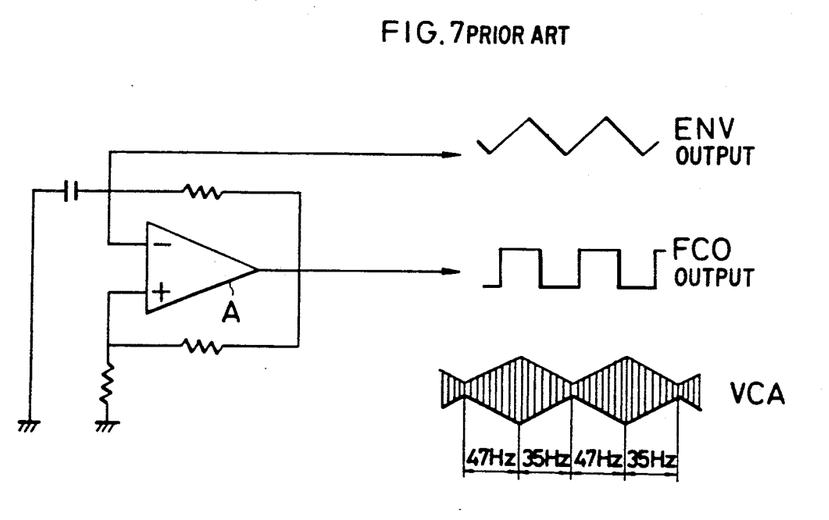
FIGS. 7-8 illustrate examples of a waveform and a synthetic waveform of each component in cases where vibration signals are formed by using the circuit shown in FIG. 6.

These circuits are connected as illustrated, and operate as follows. It should be noted that, in FIGS. 7 and 8, A denotes an operational amplifier, and B denotes a flip-flop circuit. FIG. 7 shows the waveform of each component in a case where a sensible vibration signal giving, for instance, a sense similar to that of waves surging toward a beach, then breaking, and leaving. A triangular wave of approximately 0.08 Hz (a cycle of about 12 seconds) is oscillated by the ENV 63, and a rectangular wave is oscillated by the FCO 62 in synchronism therewith. Then, an output of the VCA 61 becomes an output signal having a triangular envelope and oscillated at 47 Hz during a rise and 35 Hz during a fall. In this case, the VCO 60 is set in such a manner that its oscillation outputs become the frequencies just mentioned. The output power of the VCA 61 is amplified by an unillustrated power amplifier before it is applied to the vibration unit. Upon receipt of this signal, the vibration of the vibration unit is gradually increased at the slightly high frequency of 47 Hz, and after it has reached an apex, it falls at the slightly low frequency of 35 Hz. Accordingly, it is possible to obtain a sense that waves surge and then break and leave. Since this process is repeated at a very slow cycle, the mind of the user is soothed by the resulting vibration.

The reason why the oscillation frequency is set to 47 Hz and 35 Hz is because frequencies in their neighborhood have experimentally been proven to be very pleasing and effective. In addition, since 47 Hz and 35 Hz are at an interval of the perfect fourth in music, so that a "pleasant sensation" is liable to be created in this context as well. However, these frequencies are not confined to this range and are given merely as an example, and other frequencies may be used alternatively. This is also true of the cycle of 0.08 Hz. It is convenient to have these frequencies changeable, as required.

Figure 8:
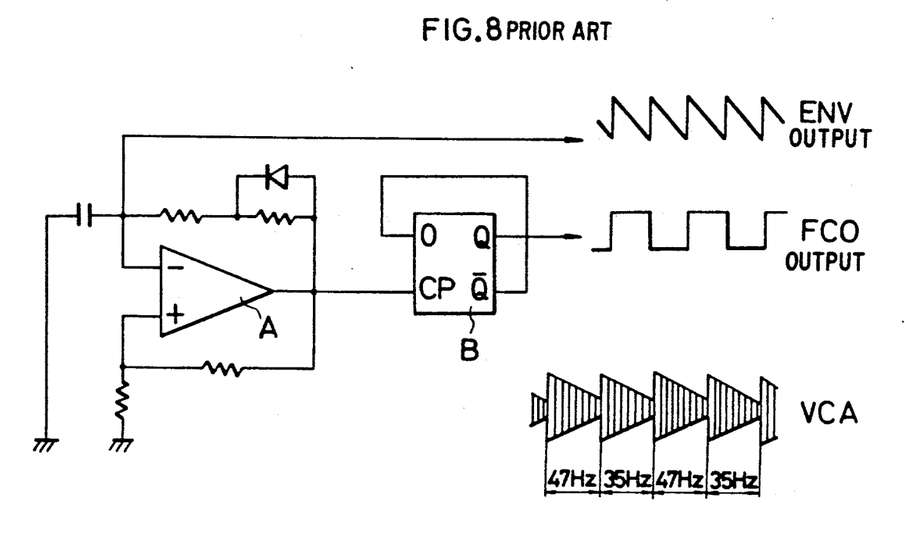

FIG. 8 is a waveform diagram of each component in a case where a sensible vibration signal is produced to give a sense that a bell of high-pitched sound and a bell of a low-pitched sound are sounded alternately. ENV 63 oscillates serriform waves of approximately 0.14 Hz. FCO 62 oscillates rectangular waves of a ½ frequency in synchronism with that frequency. Therefore, the VCA outputs, in an alternating fashion, signals of 47 Hz and 35 Hz each having an envelope of a saw-tooth wave so that when they are sensed by the body, it is possible to obtain a sense that the bell of a high-pitched sound of 47 Hz and the bell of a low-pitched sound of 35 Hz are alternately being sounded slowly. The frequencies and cycles have similar meanings as in the case of FIG. 7 and are given merely as examples. These signals constitute basic wave components for imparting sensible vibrations, but it is possible to create high-pitched sounds and cause them to overlap with each other by taking into account music and harmonics, thereby adding an acoustic effect.

The signals of FIGS. 7 and 8 can be realized by comparatively simple circuits. Examples of these circuits are shown in FIGS. 7 and 8, respectively. FIG. 7 is a mobile multivibrator circuit using a known operation amplifier A in which circuit a triangular wave and square wave are produced simultaneously. Accordingly, it is possible with this circuit to realize both output waves of the ENV 63 and FCO 62 simultaneously. Further, as regards VCO 60 to be combined with this circuit, since two frequencies are switched from each other, a quite simple circuit arrangement can answer the purpose in which the resistor or capacitor as an oscillating element of the oscillation circuit is turned on and off by an analog switch formed of a field effect transistor and a complicated and high-efficiency element as used in a music synthesizer is not always needed. The same thing can be said about the VCA 61.

Figure 9:
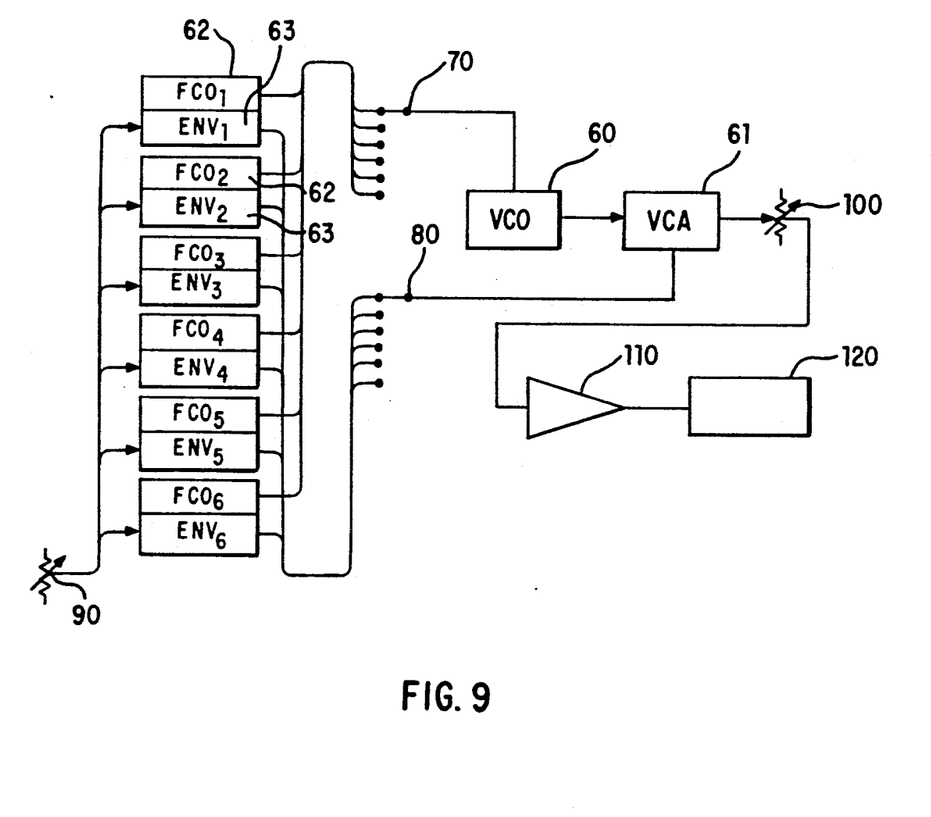
FIG. 9 illustrates a circuit which produces sensitivity vibration signals of various patterns, such as a sleep induction circuit, a tranquilization signal circuit, an awakening signal circuit, and security and emergency signal circuits.

FIG. 8 is an example of a circuit for obtaining the signal shown in FIG. 8. In this circuit, a square wave whose frequency is demultiplied by ½ is obtained through a shortened rising time saw-tooth wave oscillator by short circuiting a negative feedback resistor of a mobile multi-vibrator using an operation amplifier A and a flipflop circuit B so that the outputs of ENV 63 and FCO 62 are obtained. As regards the other parts, nothing is different from FIG. 7. The circuit shown in FIG. 9 includes a number of FCOs (like FCO 62 of FIG. 6) and a number of ENVs (like ENV 63 of FIG. 6) and are provided to produce sensitivity vibration signals of various patterns and the signals are made selectable by a selector circuit 3 which includes changeover switches 70 and 80. In the case of this circuit, the cycle is made adjustable (speed adjustment) through a variable resistor 90 in order to obtain a higher effect. In this figure, reference numeral 100 designates an intensity adjusting variable resistor, reference numeral 110 designates a power amplifier and reference numeral 120 designates a vibrating unit.

As illustrated in FIG. 1, the selector circuit 3 is provided with a multiplicity of input terminals 4-10 and one output terminal 11. The aforementioned vibration unit processing circuit 2 is input to the input terminal 5.

An output terminal of a control circuit 12 is connected to the input terminal 4. Connected to the input terminals 6-10 are a sleep induction signal circuit 13 for inducing the use to sleep; a tranquilization signal circuit 14 for stabilizing the state of mind; an awaking signal circuit 15 for issuing a signal at a preset time; a security system signal circuit 16 for detecting the entrance of an intruder into a house through a door, a window, or by climbing over a wall; and an emergency signal circuit 17 for announcing an emergency situation at the time of the occurrence of a fire or the like. Each of the circuits 13-17 produces a different wave signal to obtain a different human response by varying the waves oscillated by the ENV an/or FCO for that circuit. An operation unit 18 is adapted to issue a signal to the control circuit 12 to switch over an input to the selector circuit 3. Also connected to the operation unit 18 is a timer unit 19, which is adapted to count a preset time upon receipt of a signal from the operation unit 18.

A security detection system 20 is any well known circuit adapted to issue a signal by detecting the presence of an intruder when a beam from an infrared ray transmitting/receiving optical device is interrupted, or by processing a differential signal obtained as a result of comparison between when an moving object is detected by a security camera and when it is not detected. As this security detection system, it is possible to employ a simple detector such as a door switch or the like. An emergency broadcast device or a fire alarm (hereinafter referred to as an emergency broadcast device) 21 is any well known emergency signal generating device which is operable in units of buildings such as condominiums or hospitals. This emergency broadcast device 21 does not issue a signal at normal times, but issues an emergency signal automatically when a fire or the like has occurred or through a report to that effect.

An amplifier 22 is connected to an output terminal 11 of the selector circuit 3, while the output side of the amplifier 22 is connected to a vibration unit disposed inside a vibration pad secured at a predetermined position of a chair or a bed or inside a floor (hereinafter referred to as the vibration pad or the like) 23. Reference numeral 24 denotes a power supply circuit. The vibration unit is adapted to produce vibrations corresponding to the frequency and waveform of an energized current through the magnetic interference action between a magnet and a coil subjected to a low-frequency current.

A description will now be given of the operation of the first embodiment. A selection is made in the operation unit 18 in such a manner that a signal can be input to the vibration unit signal processing circuit 2. As a result, the control circuit 12 issues a signal to the selector circuit 3, and a low-frequency signal from audio equipment is input to the amplifier 22. As a result, the vibration pad or the like 23 vibrates in conformity with music, and the user senses it with the body. If the sleep induction signal circuit 14 is selected in the operation unit 18, a sleep induction signal having a waveform and an output that are suited to preadjusted sleep induction is selected, and the vibration pad or the like 23 vibrates in the manner thus determined. As a result, the user is able to enjoy pleasant sleep. In this case, if the timer unit 19 is operated, the vibration can be stopped after the user has fallen asleep.

If the operation unit 18 is operated to select a tranquilization signal, the vibrations become the so-called mental vibrations, and assume a waveform which is suitable for curing neurosis or a phsychosomatic disorder. When the awaking signal circuit 15 is operated, vibrations are generated at a preset time in combination with the timer unit 19 and the sensible body vibrator thus functions as an alarm. If the security signal circuit 16 is selected, the selector circuit 3 assumes a state of standby for receiving a security signal. When a security signal is issued from a door switch or the like, vibrations are generated with a preset vibrational waveform for arousing attention, thereby attracting the user's attention. When a signal from the security detection system 20 is input to the control circuit 12, the control circuit 12 sends this signal to the selector circuit 3, and allows the signal from the security signal circuit 16 to be input preferentially regardless of the signal being selected by the selector circuit 3 at that time, thereby causing the vibration pad or the like 20 to vibrate with the preset waveform so as to issue an alarm.

At the time of a fire or other emergency, upon receipt of an emergency status signal (e.g., a HIGH (5 V) of a TTL level) from the emergency broadcast device or the like 21, the selector circuit 3 receives an emergency signal from the emergency signal circuit 16 by means of the control circuit 12 regardless of what input terminal the selector circuit 3 has selected. Thus, the selector circuit 3 causes the vibration pad or the like 20 with a waveform and and output that are sufficient for announcing the emergency situation, thereby urging the user to take refuge.

Figure 2:
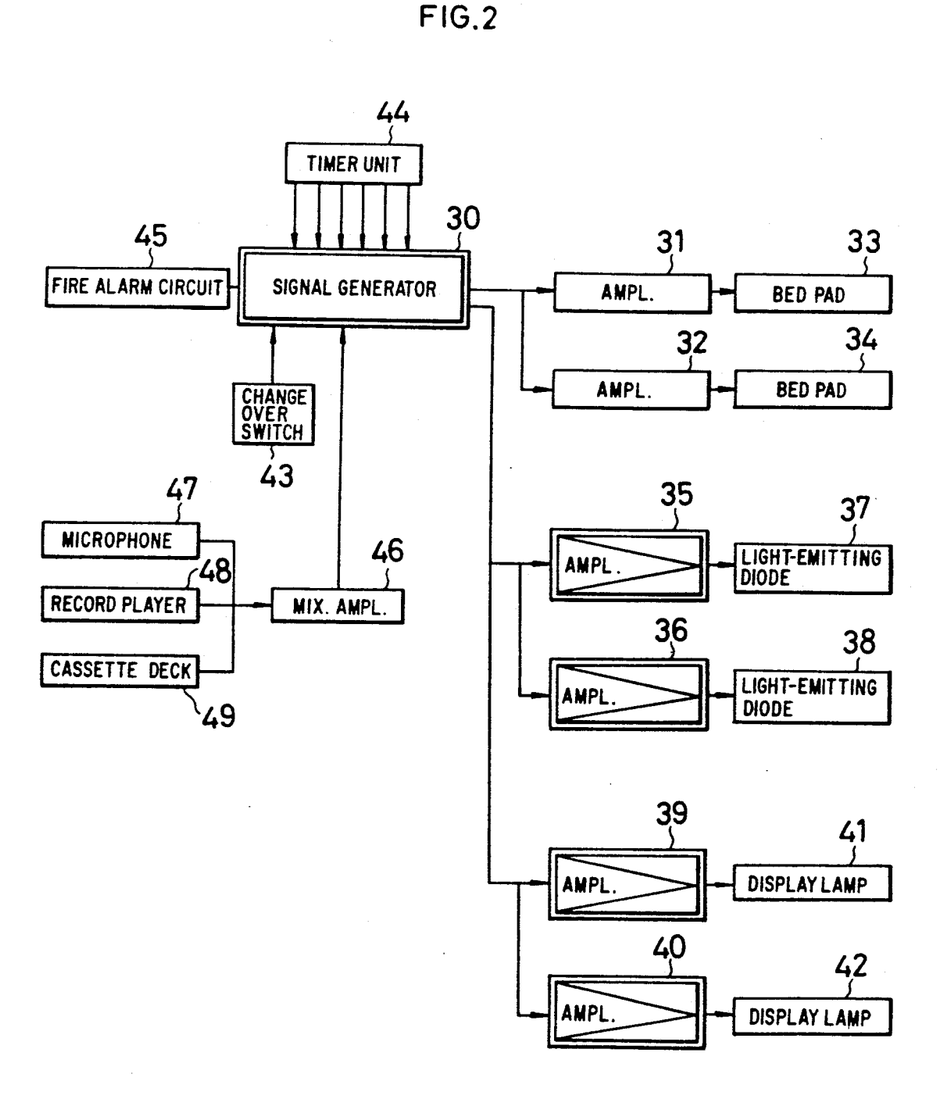
FIG. 2 is a block diagram illustrating a second embodiment of the present invention.

FIG. 2 is a block diagram illustrating a second embodiment of the present invention having a circuit configuration suitable for installation particularly at a boarding house of a school for the deaf and dumb. In this apparatus, there is added an arrangement for performing a function of transmitting various items of information by means of light-transmitting means such as display lamps at normal times, and also signals are transmitted by means of vibrations sensed by the body without resorting to the sense of sight. In this case, in the same way as the first embodiment, a combination of various signals each having a waveform for obtaining vibrations suited for transmission.

A signal generator 30, which constitutes a signal generating means, is adapted to convert various signals for such as rising and going to bed (other examples being dining, study, roll-calling, bathing, etc.) into respective suitable waveforms (basically speaking, two signals having different frequencies are prepared, and are generated independently or alternately so as to obtain a multiplicity of signals). The signals from a signal generator 30 are output to amplifiers 31, 32 which have different output values. The number of bed pads 33, 34 (which may be chairs), each accommodating therein a plurality of vibration units (not shown) connected as loads, differs from that of the first embodiment.

In addition to the bed pads 33, 34 each accommodating vibration units, light-emitting diodes 37, 38 are connected to the signal generator 30 via amplifiers 35, 36. Furthermore, display lamps 41, 42 are also connected thereto via amplifiers 39, 40. The light-emitting diodes 37, 38 are provided one for each bed, and the display lamps 41, 42 are provided one for each room accommodating a plurality of beds. The light-emitting diodes 37, 38 and the display lamps 41, 42 transmit signals to deaf and dumb students through the sense of sight in the same way as the conventional apparatus.

A changeover switch 43 serving as a waveform selecting means is connected to the control side of the signal generator 30 so that an appropriate one of the various waveforms generated by the signal generator 30 can be selected arbitrarily. Furthermore, connected to the control side of the signal generator 30 are a timer unit 44 serving as a timer means for automatically effecting the selection of a waveform with the lapse of time as well as a fire alarm circuit 45 for generating an emergency waveform signal irrespective of the operation of the timer unit 44 at the time of the occurrence of a fire. A signal transmission system for a boarding house of a school for the deaf and dumb comprises the above-described circuit configuration. In this system, although the deaf and dumb are basically deprived of the sense of hearing, in order to retain the possibility of transmitting music or speech to them, a mixing amplifier 46 is connected to the input side of the system, and vibrations are caused to vibrate by music or speech reproduced by means of a microphone 47, a record player 48, and a cassette deck 49, or the like.

A description will now be given of the operation of the signal transmission system for a boarding house of a school for the deaf and dumb in accordance with this embodiment. First, before using the system, the timer unit 44 is set in such a manner as to output signals for the routines of daily life from rising to going to bed in time sequence. Consequently, the signals are transmitted through the vibrations sensed by the body and by means of the light-emitting diodes 37, 38 and the display lamps 41, 42. As for the vibrations generated with the lapse of each set time, those that are optimally suited to the respective signals and are pleasant are produced, so that the vibrations thus produced not only serve as mere signals but also allow the users to lead pleasant daily life. It should be noted that, in addition to the above-described programmed control, when it is desirable to obtain, for instance, a going-to-bed (sleep-inducing) signal or enjoy vibrations based on music, it suffices to set the changeover switch 43 to a predetermined mode.

The control circuit 12 is a conventional logic circuit formed by a Logic IC such as TTL, which receives the signals from the operation unit 18 to select the wave forms from the vibration unit signal processor 2, the sleep induction signal circuit 13, the tranquilization signal circuit 14 and the awakening signal circuit 15, and further outputs an alarm priority command by receiving the signal of the security detection circuit 20 or the signal of the emergency broadcast device 21.

The operation unit 18 is a circuit unit which comprises a timer unit, a keyboard (switch) for operating and setting the control circuit 12, and a display indicating the set value, time and attached circuits, all of which are well known as an operation or control panel in electronic devices.

When an emergency situation such as a fire has occurred, a signal is issued by the fire alarm circuit 45 to the signal generator 30. Consequently, regardless of the set modes of the timer unit 44 and the changeover switch 43, the signal generator 30 outputs the waveform of an emergency signal and notifies the deaf and dumb students regarding the emergency situation. As a result, the students are able to take refuge safely and positively.

Figure 3:
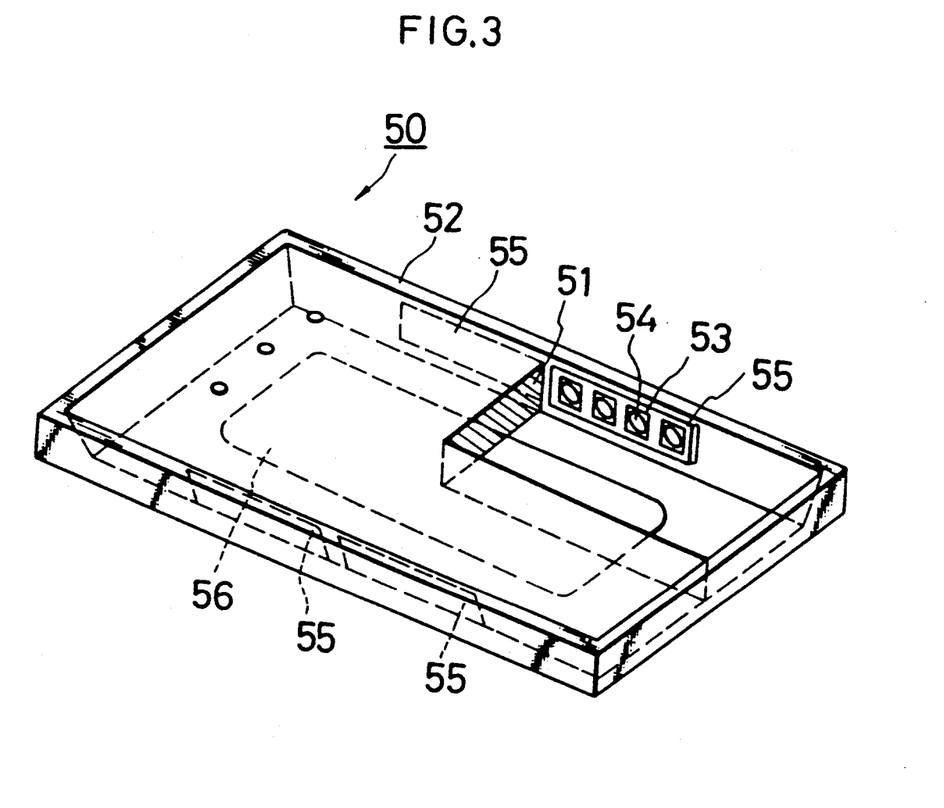
FIG. 3 is a perspective view, partly in section, of a vibration unit mounted on a water bed.
Figure 4:
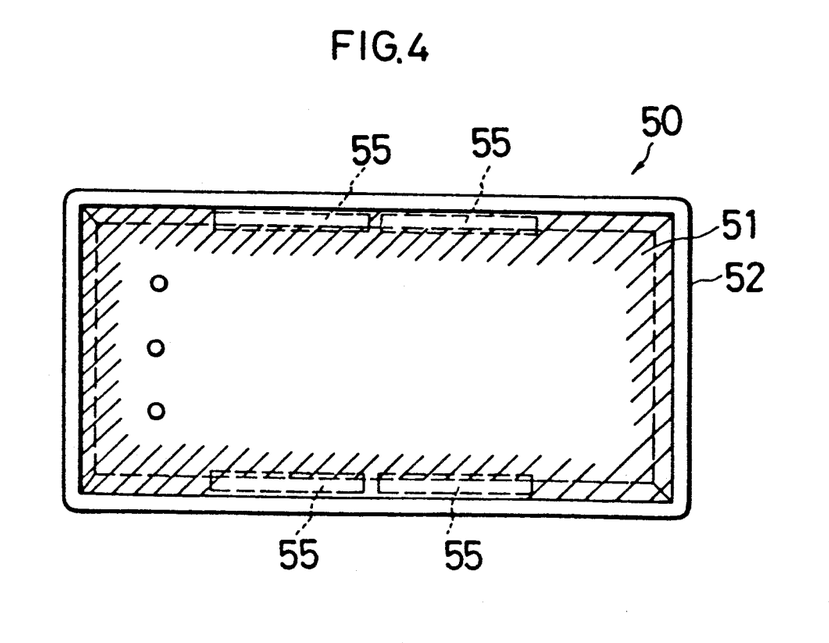
FIG. 4 is a top plan view of FIG. 3.
Figure 5:
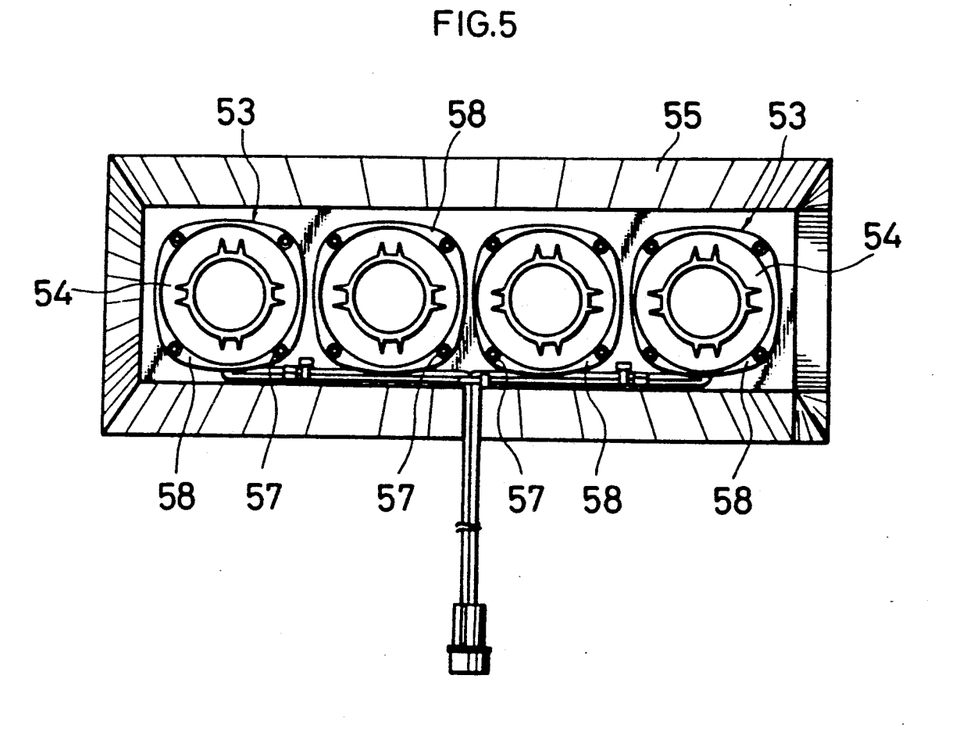
FIG. 5 is an enlarged front elevational view of the vibration unit shown in FIG. 3.

FIGS. 3 to 5 illustrate an arrangement wherein, in the apparatus of the first and second embodiments, the vibration unit connected to an ordinary bed or chair via the vibration pad is installed in a water bed without the pad, so as to transmit predetermined signal vibrations via the water contained in the water bag.

As shown, a bodily sensible sound vibration bed 50 is arranged such that a total of four vibrating plates 55 each having four transducers, i.e. vibration units, 53 are mounted in transversely opposite sides of the bed between a water bag 51 of the water bed and a bed frame 52. In the assembled state, a vibrating surface 54 of the vibration unit 53 abuts on the water bag 51.

The water bed, if a commonly available type, is arranged such that a heater 56 for adjusting the water temperature is laid on the bottom of the bed frame 52 made of urethane and covered with waterproof cloth. The water bag 51 which is made of reinforced vinyl and filled with water containing an anticorrosive agent, is placed thereon, and the entire body is covered with a cloth cover (not shown).

As for the vibrating plate 55, a panel formed of synthetic resin is provided with holes, and four vibration units 53 provided with a thin shape in design are inserted into the holes so as to be mounted, as shown in FIG. 4. As shown in FIG. 5, the mounting is effected by tightening a flange 58 of each of the vibration units 53 by means of bolts 57, by means of bonding with an adhesive or the like, or by other similar means.

The vibration units 53 are adapted to generate vibrations corresponding to the frequency of an energizing current on the basis of a principle similar to that of a loudspeaker, i.e., magnetic interference action between the magnet and the coil to which a low-frequency current is applied.

As for an optimal position at which the vibrating plate 55 is mounted, the position between the bed frame 52 and the water bag 51 on the left- and right-hand sides of the user when the user lies down in an ordinary manner is most preferable. Thus, two vibrating plates are provided on each transversely opposite side of the bed.

It is preferable not to dispose the vibrating plates 55 between the bottom of the water bag 51 and the bottom of the bed frame 52 since it becomes difficult for the vibrating plates 55 to vibrate due to the weight of water.

The four vibration units 53 disposed in each vibrating plate 55 are connected in parallel. Furthermore, in order to cause the water having large inertia to move by large degrees so as to facilitate the transmission of the vibrations, connection is provided such that the vibrating plates 55 on the respective sides of the bed are provided with opposite polarities so that when the vibrating units 53 on one side sucks the water, those on the other side pushes the water. Due to this arrangement, vibrations are imparted without attenuation.

If the user lies down on the bodily sensible sound vibration bed 50 thus arranged, since water is filled in the water bag of the bed, the surface of the bed is deformed in conformity with the configuration of the user's body and is therefore brought into close contact with the body. In this state, if low-frequency signals separated from an appropriate stereo system or the like are amplified and applied to the vibration units 53 of the vibrating plates 55, the vibrations produced by the vibration units 53 transversely disposed on the opposite sides of the bed are transmitted through the water without attenuation, and are transmitted to the entire contact surface of the user's body.

As a result, if the user listens to music through speakers provided in the vicinity of the bed or through headphones connected to terminals disposed on the bed, the user is capable of obtaining bodily sensible sound vibrations responsive to the sound of the music. At the same time, the user can enjoy listening to the music with concert-hall presence while resting his or her body. The strength of the vibrations is adjusted to a desired level by adjusting a variable resistor for the volume.

In addition, if vibrations other than those for music, e.g., those consisting of a signal of, for instance, 50 to 60 Hz, or a signal having a waveform and a frequency similar thereto, are supplied by the sensible body vibrator, it is possible to obtain a massaging effect.

What is claimed is:

1. A sensible body vibrator, comprising:
   vibration means including an electromechanical converter mounted in a human body support for generating a plurality of types of mechanical vibrations, each type of vibration being in response to a corresponding input signal, the vibration means being selectively actuated between an operative state and an inoperative state;
   signal generating means for generating a plurality of input signals for transmission to the vibration means, each signal having a corresponding waveform, and at least one of the plurality of input signals being an emergency input signal with an emergency waveform that the vibration means converts into an emergency vibration;
   selection means for selecting one of the plurality of input signals from the signal generator means and transmitting the selected input signal to the vibrator means; and
   control means for actuating the vibrator means to select and transmit a desired one of the plurality of input signals, the control means including an emergency sensor means for sensing a predetermined condition and outputting an output signal in response to detection of the predetermined condition, the control means controlling the selector means to select and transmit to the vibration means the emergency input signal in response to the output signal in preference to the desired one of said plurality of input signals and regardless of the state of the vibration means.

2. The vibrator of claim 1, further comprising timer means associated with the control means for actuating the vibrator means to the operative state for a predetermined time period.

3. The vibrator of claim 1, wherein the human body support is a water bed.

4. The vibrator of claim 1, further comprising an acoustic device associated with the signal generating means, and wherein one of said plurality of input signals has a waveform corresponding to an output of the acoustic device.

* * * * *